United States Patent
Macklis et al.

(10) Patent No.: US 10,909,641 B2
(45) Date of Patent: Feb. 2, 2021

(54) SYSTEMS AND METHODS FOR MODULAR MOBILE ENERGY STORAGE

(71) Applicant: Gridspan Energy LLC, Allston, MA (US)

(72) Inventors: Alexander Macklis, Allston, MA (US); Samuel Snodgrass, Allston, MA (US)

(73) Assignee: Gridspan Energy LLC, Allston, MA (US)

( * ) Notice: Subject to any disclaimer, the term of this patent is extended or adjusted under 35 U.S.C. 154(b) by 0 days.

(21) Appl. No.: 16/165,863

(22) Filed: Oct. 19, 2018

(65) Prior Publication Data

US 2020/0126168 A1  Apr. 23, 2020

(51) Int. Cl.
| | |
|---|---|
| G06Q 50/06 | (2012.01) |
| G05B 15/02 | (2006.01) |
| H02J 7/00 | (2006.01) |

(52) U.S. Cl.
CPC ............ *G06Q 50/06* (2013.01); *G05B 15/02* (2013.01); *H02J 7/0013* (2013.01)

(58) Field of Classification Search
CPC ........ G06Q 50/06; H02J 7/0013; G05B 15/02
See application file for complete search history.

(56) References Cited

U.S. PATENT DOCUMENTS

| | | | |
|---|---|---|---|
| 5,798,633 A | 8/1998 | Larsen et al. | |
| 6,653,749 B2 | 11/2003 | Delbridge | |
| 6,738,692 B2 | 5/2004 | Schienbein et al. | |
| 7,315,769 B2 | 1/2008 | Balan et al. | |
| 7,469,541 B1 | 12/2008 | Melton et al. | |
| 8,791,589 B2 | 7/2014 | Colello et al. | |
| 8,907,524 B2 | 12/2014 | Vandor | |
| 9,054,559 B2 | 6/2015 | De Chabris | |
| 9,367,052 B2 | 6/2016 | Steven et al. | |
| 9,463,696 B2 | 10/2016 | Teichmann | |

(Continued)

FOREIGN PATENT DOCUMENTS

| | | |
|---|---|---|
| DK | 201770537 A1 | 4/2018 |
| GB | 383204 A | 11/1932 |

OTHER PUBLICATIONS

International Search Report and Written Opinion for Application No. PCT/US2019/056857 dated Jan. 8, 2020.

*Primary Examiner* — Thomas C Lee
*Assistant Examiner* — Anzuman Sharmin
(74) *Attorney, Agent, or Firm* — Wolf, Greenfield & Sacks, P.C.

(57) ABSTRACT

Described herein are systems and methods for providing and transporting mobile energy storage units (MESU). Multiple MESUs may be provided and each may include one or more energy modules, which may be at least partially charged at a first location and at least partially discharged at one or more secondary locations, which may be separated from the first location by at least one body of water. One or more computer hardware processors may simulate scenarios for transporting multiple MESU to the secondary location(s), and each of the scenarios may include different values for variables associated with one or more characteristics of the MESU(s). Each of these scenarios may be associated with a cost for energy transport. Based on the cost determined for each of the energy transport scenarios, one of the simulated energy transport scenarios may be selected and scheduled using a transport scheduling system.

16 Claims, 12 Drawing Sheets

(56) References Cited

U.S. PATENT DOCUMENTS

| | | |
|---|---|---|
| 9,537,318 B2 | 1/2017 | Kaplan et al. |
| 9,705,168 B2 | 7/2017 | Schmid |
| 9,753,440 B2 | 9/2017 | Pratt et al. |
| 9,772,643 B2 | 9/2017 | Steven et al. |
| 9,812,865 B2 | 11/2017 | Treppmann et al. |
| 9,887,570 B2 | 2/2018 | Johnsen et al. |
| 10,068,714 B2 | 9/2018 | Juventin |
| 2005/0261844 A1* | 11/2005 | Iwers ............ B63G 8/08 702/63 |
| 2011/0282807 A1* | 11/2011 | Colello ............ B60L 53/51 705/412 |
| 2015/0149074 A1 | 5/2015 | Lepisto |
| 2019/0146463 A1* | 5/2019 | Hsieh ............ G06Q 50/04 700/101 |
| 2020/0005201 A1* | 1/2020 | Fife ............ G06Q 10/0639 |

\* cited by examiner

SYSTEMS AND METHODS FOR MODULAR MOBILE ENERGY STORAGE

BACKGROUND

Electrical power may be received from electrical grids of varying sizes. Large scale power grids may generate and distribute power over large geographic areas. Micro-grids may combine controllable generation facilities and/or renewable power sources to supply power to a small number of electrical load consuming facilities that may be isolated from a larger power grid.

SUMMARY

A modular mobile energy storage system is provided herein, the modular mobile energy storage system including: a plurality of mobile energy storage units, wherein each of the plurality of mobile energy storage units includes a plurality of energy modules configured to be at least partially charged at a first location and configured to be at least partially discharged at a second location separated from the first location by at least one body of water; at least one computer hardware processor programmed to: simulate, a plurality of energy transport scenarios for transporting the plurality of modular mobile energy storage units between the first location and the second location via the at least one body of water for a predetermined amount of time to determine a cost for each of the plurality of energy transport scenarios, wherein each of the plurality of energy transport scenarios includes different values for variables associated with one or more of target depth of discharge, maximum depth of discharge, target delivery period, and minimum delivery period; and select, from among the simulated plurality of energy transport scenarios, one of the plurality of energy transport scenarios based, at least in part, on the determined cost for each energy transport scenario; and a transport scheduling system configured to schedule transport of the plurality of modular mobile energy storage units between the first location and the second location in accordance with the selected one of the plurality of energy transport scenarios. In some embodiments, a modular mobile energy storage system is provided, the modular mobile energy storage system comprising: a plurality of mobile energy storage units, wherein each of the plurality of mobile energy storage units includes a plurality of energy modules configured to be at least partially charged at a first location and configured to be at least partially discharged at a second location separated from the first location by at least one body of water; at least one computer hardware processor programmed to: select, from among a plurality of potential energy transport scenarios, one of the plurality of energy transport scenarios based, at least in part, on a utility function that is configured to determine cost for each energy transport scenario for transporting the plurality of modular mobile energy storage units between the first location and the second location via the at least one body of water for a predetermined amount of time, wherein each of the plurality of energy transport scenarios includes different values for variables associated with one or more of target depth of discharge, maximum depth of discharge, target delivery period, and minimum delivery period; and a transport scheduling system configured to schedule transport of the plurality of modular mobile energy storage units between the first location and the second location in accordance with the selected one of the plurality of energy transport scenarios.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
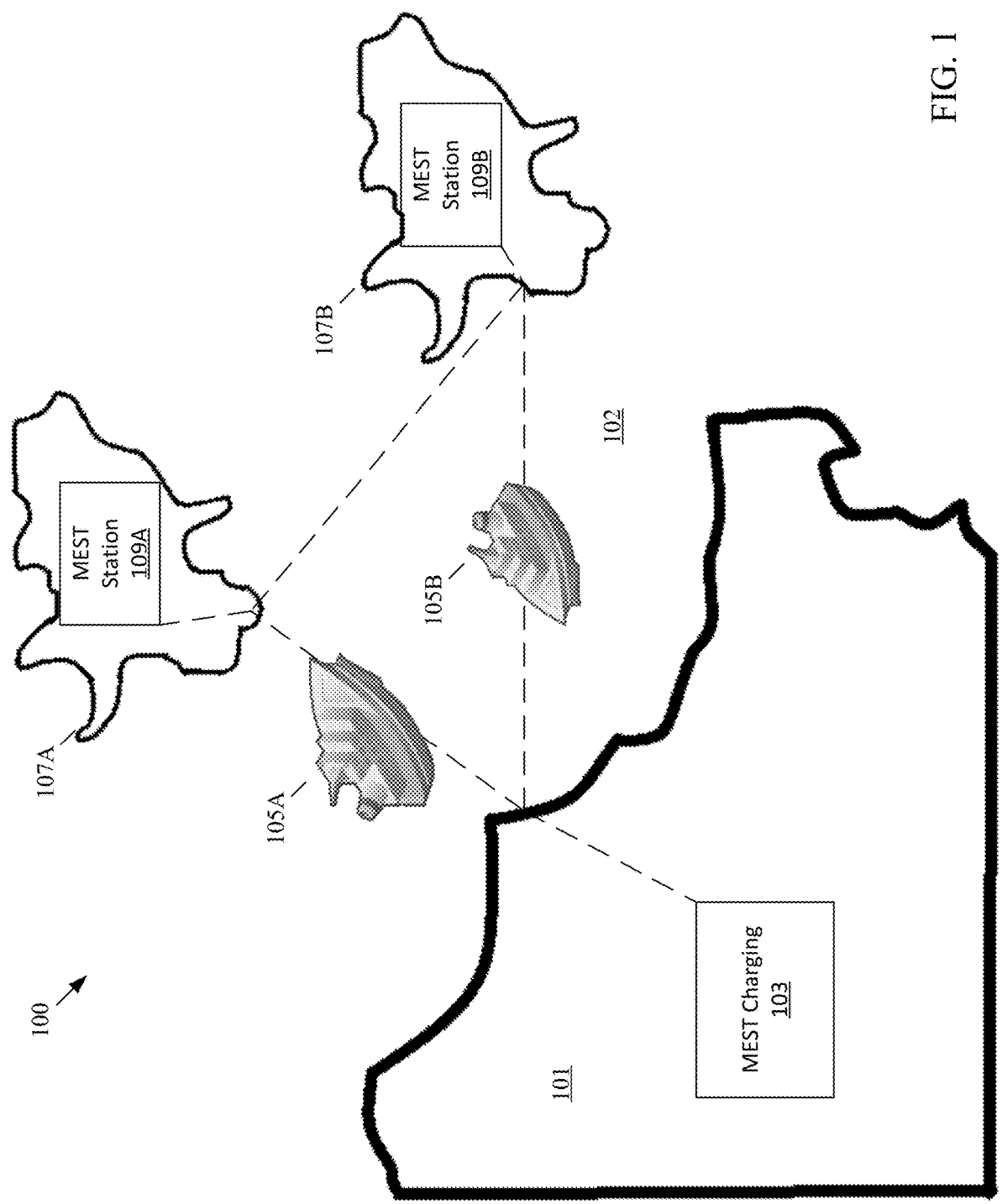
FIG. 1 illustrates an exemplary embodiment of a mobile energy storage transmission (MEST) system according to some embodiments of the technology described herein.

In modern society, energy is consumed at various geographical locations to provide, among other things, power for electrical devices. The vast majority of geographical locations that consume energy receive their power from a large-scale power grid, which sources power from one or more large power generation stations and distributes power on the grid using physical electrical components (e.g., wires and cables). Some geographical locations where power is needed, such as island communities, are not well-suited for connection to a large-scale power grid due to geographical impediments (e.g., a body of water) between the source of the power on the grid and the location where the power is needed. Such geographical locations may choose to generate their own power (e.g., using diesel generators, solar power, etc.), rather than incur the expense of trying to connect to a large-scale power grid. However, for some communities, local power generation may still be cost prohibitive, polluting, and/or insufficiently reliable. The inventors have recognized that local power generation at certain geographical locations may be replaced or supplemented by transporting modular energy sources (e.g., batteries) from power generation/charging sources/stations to geographical locations where the power is needed, resulting in a more cost effective and efficient system. For example, such modular energy sources may provide power to meet application specific needs that may reduce pollution, enhance reliability of the power supply, and/or support the development of intermittent renewable energy resources.

Described herein are systems and methods for providing and transporting mobile energy storage units (MESU) between locations that generate/charge energy modules included in the MESU and locations that consume power from the energy modules. Multiple MESUs may be provided and each MESU may include one or more energy modules. The MESU and/or energy modules included therein may be at least partially charged at a first location and at least partially discharged at one or more secondary locations. In some embodiments, the secondary location(s) may be separated from the first location by at least one body of water.

In order to provide power using energy modules in a MESU, it may be beneficial to consider a wide range of parameters and/or variables that are not necessarily considered in conventional approaches to power transportation. For example, the parameters and/or constraints associated with the power supply market, one or more power demand markets, the transportation market, and aspects of the MESUs themselves may be considered. Some embodiments may search for an optimal solution within such a complex variable space using one or more simulations to determine how to provide power efficiently in view of the constraints on the MEST. One or more computer hardware processors may simulate scenarios for transporting the one or more MESU to the secondary location(s) and each of the scenarios may include different values for variables associated with one or more characteristics of the MESU(s). Each of these scenarios may be associated with a cost for energy transport, which the simulation may determine based, at least in part, on the provided input values. Based on the cost determined for each of the energy transport scenarios, one of the simulated energy transport scenarios may be selected. The cost may be a monetary cost, the output of a utility function, and/or a cost determined using a suitable objective function (e.g., a function that gives preferential weight to scenarios with longer duration MESU deployments). The cost may include both water-based and land-based transportation between the first location, the secondary location(s), and/or any intermediate locations. A transport scheduling system may be configured to schedule transportation of the one or more MESUs between the first and secondary locations.

The inventors have recognized and appreciated that it may be difficult to supply electricity to certain geographic locations. For example, there may be difficulties in generating and/or transmitting power, which may require physical connections to large power stations to be done efficiently. In some geographic locations, physical isolation from a power grid may prevent the practical generation and/or transportation of electricity. For example, current power transmission technology may be limited by a body of water or other difficult terrain.

Conventionally, some locations (e.g., isolated locations) may be supplied with power by generation facilities, such as facilities for small-scale fuel oil generation (e.g., diesel generators), solar generators, and wind generators. However, fuel oil generators are substantially more expensive to operate and maintain compared to receiving energy from a large scale power grid among other drawbacks. Other known power generation solutions, such as renewable power generation (e.g., photovoltaics and wind power) in conjunction with a micro-grid may require substantial upfront investment and may only provide intermittent power thereafter (e.g., depending on environmental conditions). Some locations may be separated from a power station by a body of water and may be connected to a power grid by a subsea cable interconnection. However, installing and maintaining such a cable may be prohibitively expensive for some locations. These conventional approaches may all be vulnerable to damage from environmental factors and/or events, such as large storms, and require substantial repairs and delay before becoming operational after such an event.

The inventors have recognized that existing techniques for delivering power to locations not directly connected to the power grid may be improved upon. A MESU, as described herein, provides for modular energy storage and may therefore be configured to provide power to isolated locations efficiently. Such isolated locations may be perpetually isolated (e.g., separated from a large scale grid by a permanent body of water) or temporarily isolated (e.g., separated from any grid by storm/environmental damage). For example, modular energy storage allows for the storage capacity to be configured by changing the number and characteristics of energy modules. Modular storage also allows for configurable parameters related to charging and discharging of energy modules. Furthermore, once modules are degraded, they may be exchanged with substantial ease compared to the costs of repairing and/or maintaining equipment used in some conventional energy transfer approaches described above. Charging modular energy storage units at one location and transporting them to a second location may therefore improve power transmission technology.

FIG. 1 illustrates an exemplary embodiment of a mobile energy storage transmission (MEST) system 100 according to some embodiments of the technology described herein. The MEST system is configured to transport power between locations 101 and 107A&B, which are separated by an expanse 102, using vessels 105A&B, for example. The location 101 includes MEST charging station 103. Locations 107A&B include MEST stations 109A&B.

The locations 101 and 107A&B may be any suitable geographic locations. In some embodiments, location 101 is a coastal geographic location and the locations 107A&B are islands. In such examples, the expanse 102 includes one or more bodies of water (e.g., a bay, sound, estuary, river, and/or a portion of a sea/ocean). The expanse 102 may also include islands and/or natural features and obstacles to transportation that are not illustrated.

In some embodiments, the location 101 is connected to a large scale power grid. For example, the large scale power grid may be connected to a substantial portion of a country or large geographical area. Additionally, the large scale power grid may be connected to one or more power stations that use various fuel sources, such as fossil-fuels, nuclear power, geothermal power, biomass fuel, solar power, wind power, and/or hydroelectric power, to generate power on a large scale, such as 100 MW, 200 MW, 500 MW, or more per power station at a high voltage. The large scale power grid may distribute power at a market price determined by supply, demand, and/or any other applicable pricing mechanisms and/or regulations.

In some embodiments, the MEST charging station 103 is connected to the large scale power grid. The MEST charging station 103 may include any suitable circuitry for charging one or more MESUs. For example, the MEST charging station 103 may purchase power from the large scale power grid and use the power to charge the one or more MESUs. In some embodiments, processing circuitry may control parameters, including but not limited to the amount of charging, the timing of charging, and/or the rates of charging and discharging, associated with charging the MESU. The parameters associated with charging may be based on power supply conditions at location 101, power demand conditions at locations 107A&B, conditions of the MESU used in the MEST 100, scheduling and/or cost of transportation using the vessels 105A&B, and/or any other suitable parameters. The MEST charging station 103 may be configured to charge multiple MESUs, and may be configured to charge all or a portion of the energy modules included in the MESUs. In some embodiments, the extent to which each energy module is charged and the number of energy modules that are charged and/or included in the MESU may be determined by the processing circuitry based on available, inferred, and/or predicted parameters, for example that may relate to the available supply of power at location 101, the demand for power at locations 107A&B, and the respective estates of one or more MESU in the MEST 100. Exemplary parameters are described, at least with reference to FIGS. 5-12, and throughout the description.

One or more vessels (e.g., vessels 105A&B) may be used to transport MESU between locations 101, 107A, and/or 107B. The MESU being transported may include energy modules that are fully or partially charged and/or discharged. For example, partially and/or fully charged MESUs may be transported on vessel 105A to location 107A. As another example, partially and/or fully discharged MESUs may be transported from location 107B to MEST charging station 103. The MESU may be transported, at least in part, over land at the locations 101, 107A, and/or 107B in addition to transportation across the expanse 102, which may be one or more bodies of water. In some embodiments, the vessels 105A&B may be any suitable ship for transporting the MESU. The vessels 105A&B may be chartered at suitable times. In some embodiments, a transportation scheduling system is configured to schedule transportation of one or more MESUs.

The MEST stations 109A&B are supplied with one or more MESUs transported by the vessels 105A&B. The MEST stations 109A&B supply power from the MESU to the locations 107A&B respectively. The MEST stations 109A&B may be configured to transfer all or a portion of the energy stored in all or a portion of the energy modules in any particular MESU to one or more electrical loads. The energy transferred from the energy modules may be used by any suitable electrical circuitry. The energy may be used instead of or in addition to energy generated by other power sources at the locations 107A&B, such as generation facilities. In some embodiments, the MEST stations 109A&B are connected to micro-grids at the locations 107A&B. The MEST stations 109A&B may be connected (e.g., via one or more micro-grids) to one or more electrical load consuming buildings, facilities, devices, and/or transmission and distribution networks. In some embodiments, the MEST system 100 is configured to measure and/or predict the demand for power at the locations 107A&B. A MESU at each of the locations 107A&B may be discharged to a target depth of discharge which may be all or a portion of a suitable maximum discharge.

Figure 2:
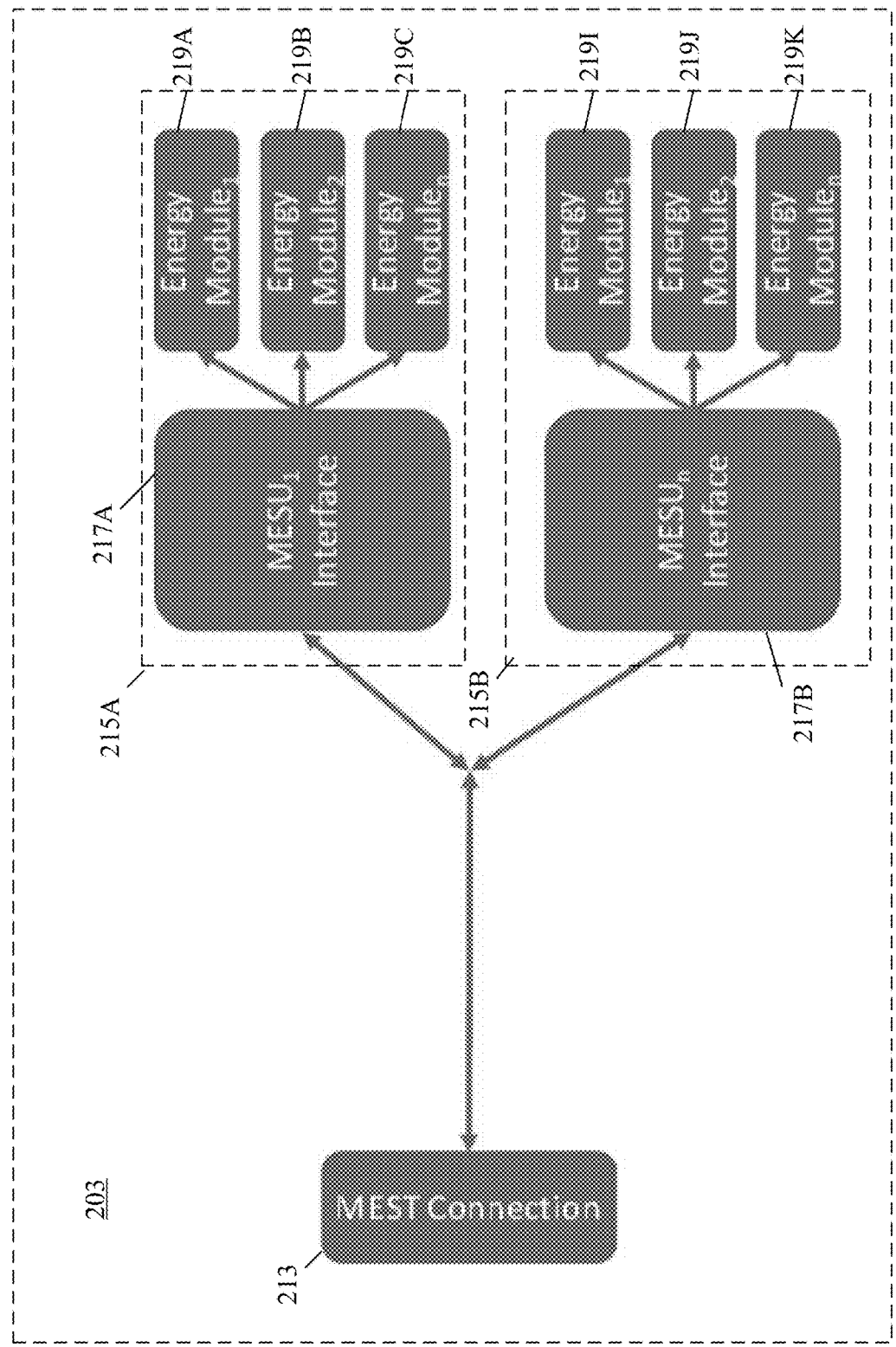
FIG. 2 shows a MEST charging station according to some embodiments of the technology described herein.

FIG. 2 shows a MEST charging station 203 according to some embodiments of the technology described herein. The MEST charging station 203 includes MEST connection 213, and MESUs 215A&B. Each of the MESUs 215A&B include respective MESU interfaces 217A&B and energy modules 219A, 219B, 219C, 219I, 219J, and 219K. The MESU charging station 203 may be configured to operate in the MEST system described with reference to FIG. 1.

The MEST connection 213 may be any suitable circuitry for connecting one or more MESU 215A&B to a power grid, such as a large scale grid. The grid may provide power to charge the MESU 215A&B, which allows for the MESU 215A&B to be charged using electricity generated and supplied at a low cost relative to the locations where the MESU 215A&B will be deployed. The MEST connection 213 may also receive power from the grid for other reasons related to, for example, grid management and the support of intermittent renewable resources.

Furthermore, the MEST connection 213 may interface with other aspects of the MEST system described with reference to FIG. 1 and throughout this disclosure. For example, the MEST connection 213 may receive parameters relating to the available and/or predicted supplies and demand of power at different points in the MEST system. In further examples, the information received via the MEST connection 213 may be utilized to determine an amount of time the MESU 215A&B will be at the MEST charging station 203 and the times at which power should be purchased for charging the MESU 215A&B. For example, if it is determined that the amount of time required for charging the MESU 215A&B is less than the time that the MESU 215A&B will be present at the MEST charging station 203, then the MESU 215A&B may be charged at times that power is predicted to be the least expensive.

Each MESU 215A&B may be configured to electrically interface with MEST charging station 203. The MESU 215A&B may maintain any suitable amount of charge. The MESU 215A&B may be configured to charge and discharge within limits determined in accordance with methods described herein. In the example of FIG. 2, the MESU 215A&B are configured to store power in multiple energy modules 219A-C and 219I-K respectively. Each MESU 215A&B is shown with 3 respective energy modules, however, it should be appreciated that a MESU used in accordance with some embodiments is not required to have any certain number of energy modules or a number of energy modules equal to any other MESU. The modular nature of the MESU allows for one or more energy modules to be added or removed from each MESU 215A&B, for example based on the duration the MESU is expected to be used or the degradation of the energy module(s). In some embodiments, a MEST system may include MESU (e.g., 215A&B) of different sizes. For example, some MESU may be configured to be one cubic meter or smaller in volume and/or under 1-2 metric tons, while other MESU within a MEST system may be larger or smaller. In some embodiments, the physical size of the MESU is configured based on the methods of transporting the MESU. For example, transportation of the MESU by forklift may require use of smaller MESU than when cranes and trucks are available for transportation of the MESU.

Figure 3:
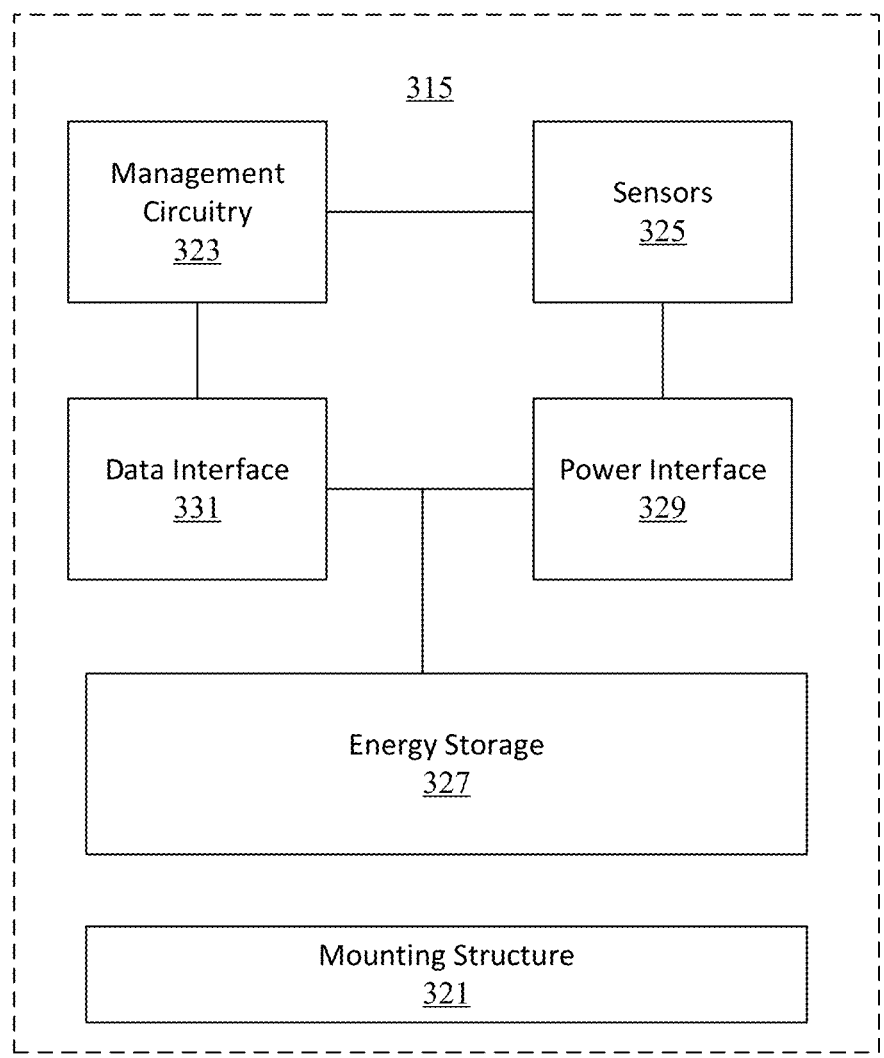
FIG. 3 shows an energy module according to some embodiments of the technology described herein.

FIG. 3 shows an energy module 315 according to some embodiments of the technology described herein. The energy module 315 includes mounting structure 321, management circuitry 323, sensors 325, energy storage 327, power interface 329, and data interface 331. The energy module 315 may be operable as part of the MEST system and/or MESU described with reference to FIGS. 1&2 for example.

The mounting structure 321 is configured to mechanically couple the energy module 315 to the MESU. The mounting structure 321 may be any suitable coupling which may support the energy module 315 and be robust to the operating environment. The mounting structure 321 may be configured to allow the energy module 315 to be added to or removed from one or more MESU.

The management circuitry 323 may be any suitable circuitry such as a processor, field-programmable gate array (FPGA), application specific integrated circuit (ASIC), and/or microprocessor. The management circuitry 323 is configured to manage the charging and discharging of the energy module 315. The management circuitry 323 may also be configured to interface with sensors 325, data interface 331, and/or any other suitable circuitry. The management circuitry 323 may then provide data to external devices, such as other aspects of the MEST system described with reference to FIG. 1.

Sensors 325 may detect any suitable characteristics of the energy module 315 and communicate the data to the management circuitry 323. The sensors 325 may include a thermometer, voltmeter, coulomb counter, accelerometer or other inertial measurement unit, a global positioning system receiver, and/or any other suitable circuitry. The sensors 325 may monitor the charge in the energy storage 327 as well as the degradation of the energy storage 327.

Energy storage 327 may be any suitable battery, such as a Lithium-ion, Lithium-polymer, lead-acid, nickel-cadmium, nickel-metal hydride, and/or any other suitable battery, or energy storage system, such as a supercapacitor. The energy storage 327 may be partially or fully charged and discharged repeatedly to a level that may be controlled by the management circuitry 323 and the sensors 325.

Power interface 329 is configured to provide power from the energy storage to a MEST station and/or any other suitable outlet for power. The power interface 329 for one or more energy modules (e.g., 315) may be connected in any suitable manner. For example, the mounting structures (e.g., 321) may include electrical connections that are in electrical communication with the power interfaces. The energy modules may be attached in series and/or parallel. In some embodiments, the power interface 329 is configured to be connected to circuitry suitable for providing power to a small or micro electrical grid, for example a collection of buildings that are configured to be powered by a generator, such as at locations 107A&B.

The data interface 331 may connect to aspects of the MEST system described herein via any suitable networking circuitry. The data interface may send and receive data from any suitable sensors and circuitry in the energy modules, MESU, and/or MEST system.

Figure 4:
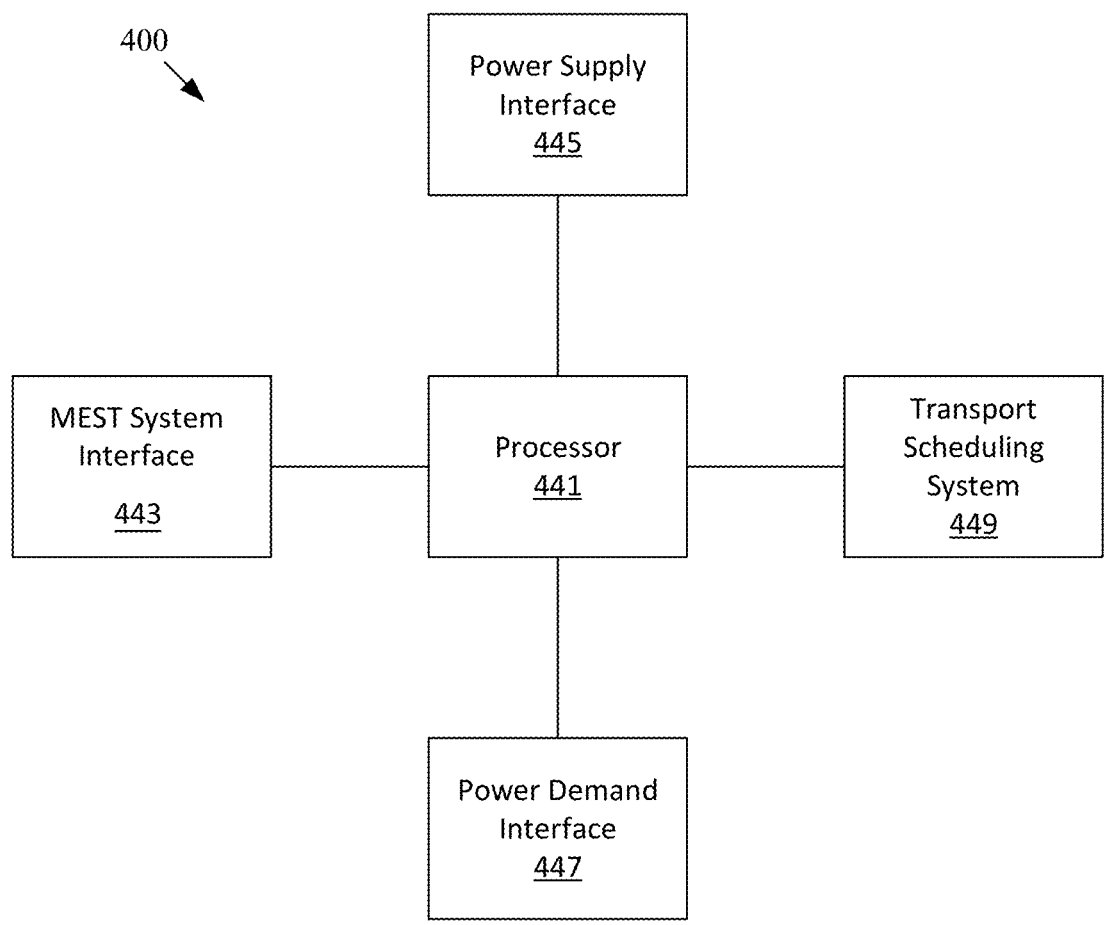
FIG. 4 shows a hardware processor that may interface with the systems and methods described herein.

FIG. 4 shows a hardware processor that may interface with the systems and methods described herein. The processor 441 is configured to interface with a MEST interface 443, a power supply interface 445, a power demand interface 447, and a transport scheduling system 449. In some embodiments, the process 441 may be configured to interface with the systems described with reference to FIGS. 1-3 and implement the methods described with reference to FIGS. 5-12.

The processor 441 may be any suitable processor, such as a processor, microprocessor, ASIC, and/or FPGA. The processor 441 may interface with computer readable storage media that store instructions that may be executed by the processor. The MEST interface may be configured to interface with aspects of the MEST system (e.g. 100), such as an individual MESU. The power supply interface 445 may be configured to receive data and parameters related to the supply of power available to the MEST system. For example, the power supply interface 445 may receive pricing data related to a large scale electrical grid (e.g., at location 101). The power demand interface 447 may be configured to receive information related to the demand for power at one or more locations (e.g., 107A&B). The demand may be measured in real time or predicted based on information received at the power demand interface, such as historical information and/or weather information. In some embodiments, the power supply interface 445 and the power demand interface 447 may be configured to predict power supply and demand based on available data, and the predications may be refined as additional data becomes available.

The data received through the interfaces 443, 445, and/or 447 and/or the transport scheduling system 449 may be used to determine a schedule and/or implementation strategy for transporting one or more MESUs. In some embodiments, the schedule may include times, departure points, destination location(s), and routes of travel for one or more MESU transportation trips. In some embodiments, the schedule and/or implementation strategy may select and schedule different methods of transportation for different respective portions of a trip, for example by chartering a boat for a trip over a body of water and a vehicle for last-mile transportation over land. The transport scheduling system 449 may then be used to schedule the transportation and the chartering and/or operation of a vessel.

Figure 5:
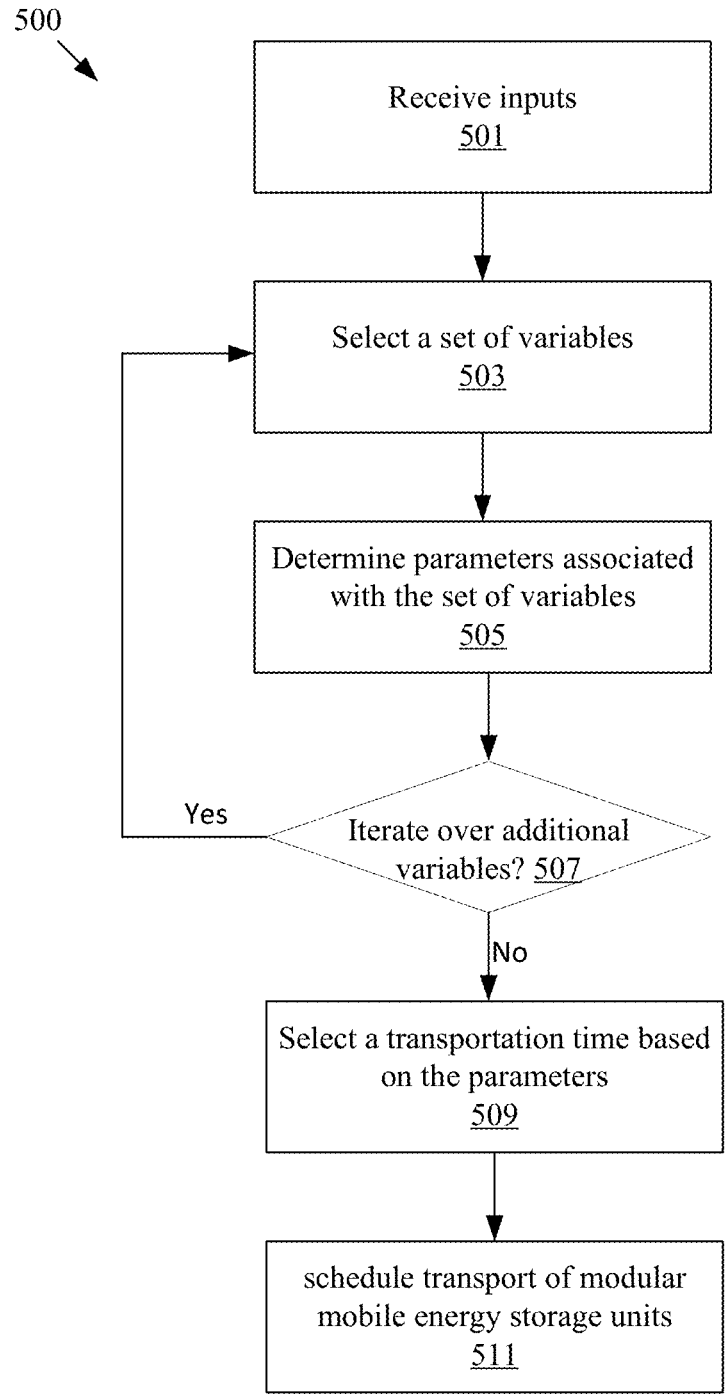
FIG. 5 shows a process flow for scheduling transport of one or more mobile energy storage unit (MESU), according to some embodiments of the technology described herein.

FIG. 5 shows a process flow 500 for scheduling transport of one or more MESUs, according to some embodiments of the technology described herein. The process flow 500 may be carried out by the systems described with reference to FIGS. 1-4.

At act 501, inputs are received for determining scheduling of energy transportation. The inputs may relate to power supply and demand at one or more locations, e.g., as was described with reference to FIGS. 1 and 4. The inputs received may also relate to the state (e.g., charge and degradation) of one or more MESU, e.g. as was described with reference to FIGS. 2 and 3. For example, the inputs may relate to the logistics of transporting MESU, technology inputs that relate to the state of the MESU, and/or scenario inputs that relate to power supply and demand. The variables may be updated in real time (e.g., refreshed within milliseconds of new data becoming available). The inputs may be received, for example, from data sources operated independently of the MEST system and/or the output of a predictive analytics process.

At act 503, a set of variables is selected. The variables may be selected based on the inputs to represent costs and constraints related to supply power using the MESU. The variables may be iteratively selected from a suitable variable space. The selected variables may relate to variables that are iterated over and/or determined by the MEST system. For example, the process 500 may iterate over possible options for storage capacity of the MESU, a maximum depth of discharge for the MESU, a target depth of discharge for the MESU, a target MESU delivery period, a minimum and/or maximum MESU delivery period, and/or other suitable options for technology and logistics. At act 507, the process may iterate over a variable space.

At act 505, the variables are used to determine a set of parameters associated with the selected set of variables. The determined parameters may relate to the available power supply market and the power demand. Additionally, the parameters may be associated with the MESU and MEST system, such as the configurations, charge levels, and levels of degradation in the MESU. Examples of determining MEST parameters are described in more detail below and at least with reference to FIG. 6.

At act 509, the process flow selects a transportation time based on the parameters determined at act 505. The parameters may be associated with a transportation scenario that allows the MEST system to operate efficiently while satisfying the available constraints. At act 511, the transportation of one or more MESU may be scheduled based on the determined parameters.

Figure 6:
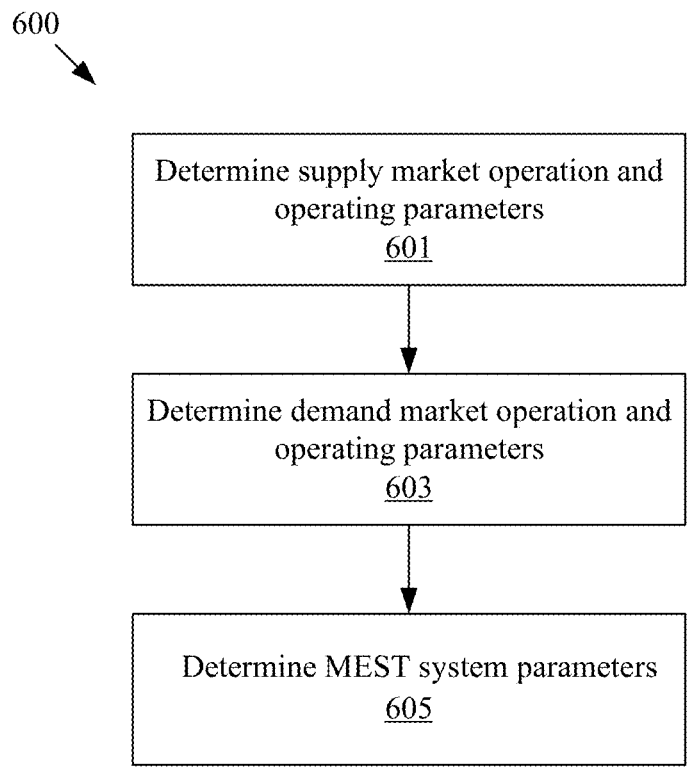
FIG. 6 shows a process flow for determining parameters associated with a candidate transportation time, according to some embodiments of the technology described herein.

FIG. 6 shows a process flow for determining parameters associated with a candidate transportation time, according to some embodiments of the technology described herein. The process flow 600 may be carried out by the systems described with reference to FIGS. 1-4.

At act 601, supply market operation and operating parameters may be determined. The supply market may be any suitable large scale power grid and/or power station (e.g., at location 101). In some embodiments, the supply market parameters may relate to the cost of power during the times the MESU will be able to charge. For example, the parameters may be used to determine a least expensive time to charge the MESU.

At act 603, demand market operation and/or operation parameters are determined. In some embodiments, the predicted or actual level of power being utilized may be determined. In addition, the level of power available, such as may be provided by a generator, during one or more time periods. The process may determine the amount of power coverage that may be provided by generators available at the location.

At act 605, parameters related to the MEST system may be determined. For example, the locations, the available transportation times, the charge levels, the capacity configurations, and the charge levels of the MESU may be determined. In some embodiments, if one or more MESU are determined to be unable to operate through a necessary minimum time period, one or more additional MESUs may be purchased or provided. In some embodiments, one or more of the most degraded modules in the MESU may be removed and/or exchanged for new energy modules and/or other energy modules within the same or a different MEST system.

Figure 7:
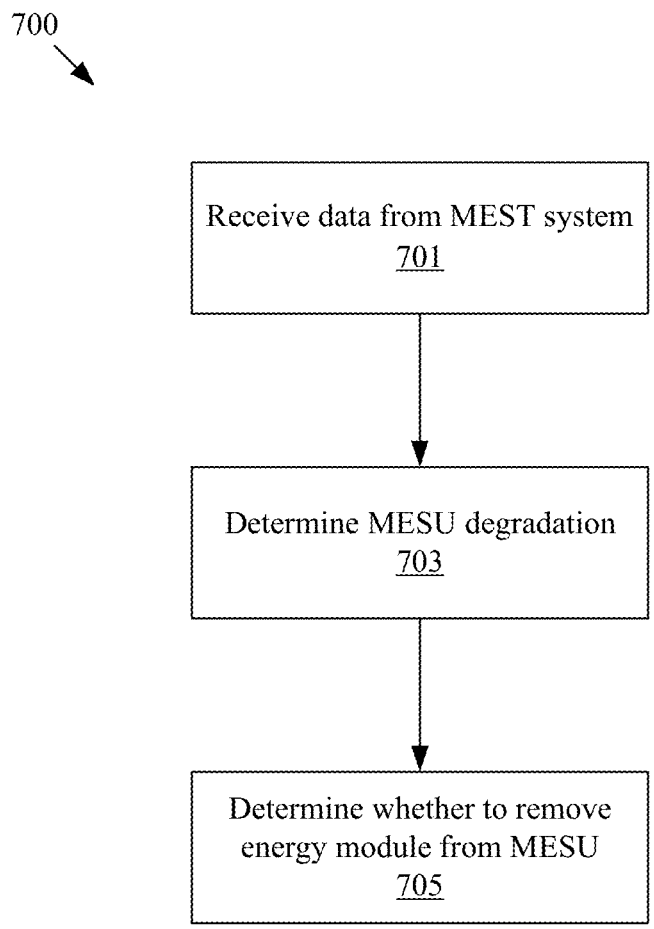
FIG. 7 shows a process flow for determining MESU parameters according to some embodiments of the technology described herein.

FIG. 7 shows a process flow 700 for determining MESU parameters according to some embodiments of the technology described herein. The process flow 700 may be carried out by the systems described with reference to FIGS. 1-4. The process flow 700 may implement the act 605, for example.

At act 701, data is received from the MEST system. The data may relate to the individual MESU, e.g. as was described with reference to FIGS. 3 and 4. In some embodiments, data may be received from MEST stations (e.g., 109A&B) regarding the demand for power and status of deployed MESU. Any suitable MEST data may be received.

At act 703, MESU degradation may be determined. The MESU degradation may be measured by management circuitry in each MESU. In some embodiments, the MESU degradation may be calculated based on the history of charging and discharging the MESU. At act 705, it may be determined whether to remove and/or replace one or more energy modules within a MESU. The replacement may be determined based, at least in part, on the data and degradation.

Figure 8:
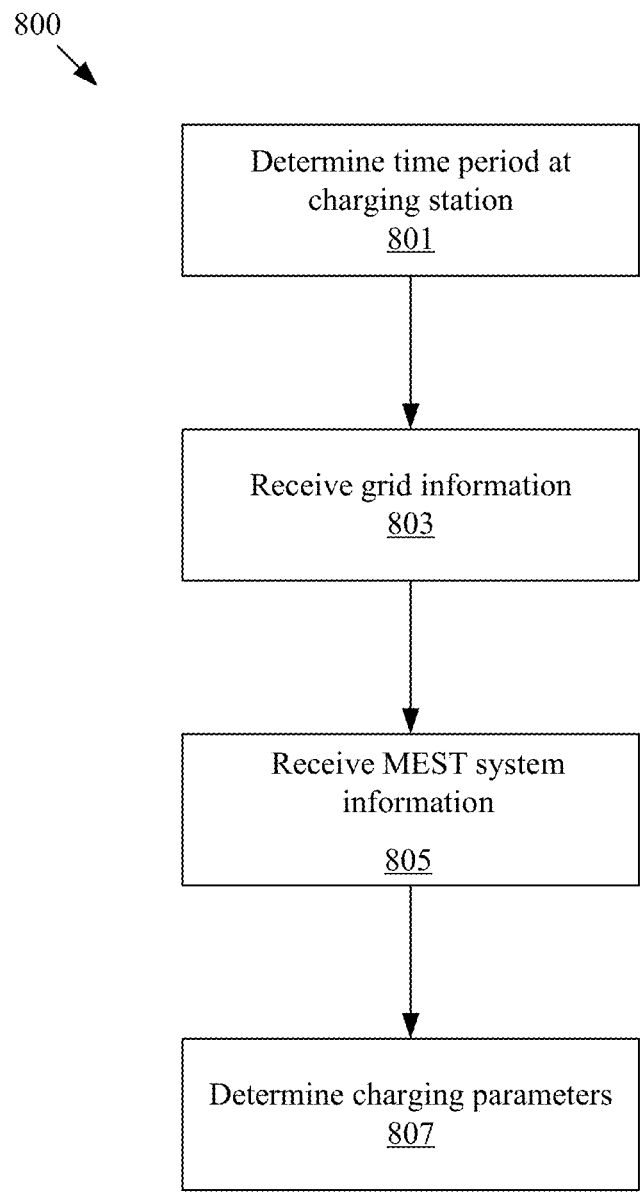
FIG. 8 shows a process flow for determining supply market parameters according to some embodiments of the technology described herein.

FIG. 8 shows a process flow 800 for determining supply market parameters according to some embodiments of the technology described herein. The process flow 800 may be carried out by the systems described with reference to FIGS. 1-4. The process flow 800 may implement the act 601, for example.

At act 801, a time period during which the MESU(s) are expected to be present at the charging station is determined. The period of time may be a period of time between potential transportations of the MESU. At act 803, information related to the electrical grid used to charge the MESU may be received. The data may relate to actual or expected price data during the time period. For example, the grid may provide pricing data during blocks of time and/or in real time.

At act 805, MEST information is received. The MEST information may include information related to the maximum and/or target depths of discharge for the MESU, the expected deployment for the MESU to be deployed, and/or any other suitable MESU parameters. At act 807, parameters related to charging the MESU may be determined. For example, the charging parameters may relate to the amount of power used to charge the MESU(s), the amount of time the MESU(s) are charged, the times at which the MESU(s) are charged, and/or any other suitable charging parameters. For example, the MESU may be charged at off-peak times at which the power is less expensive or charged as quickly as practicable in order to rapidly deploy the MESU.

Figure 9:
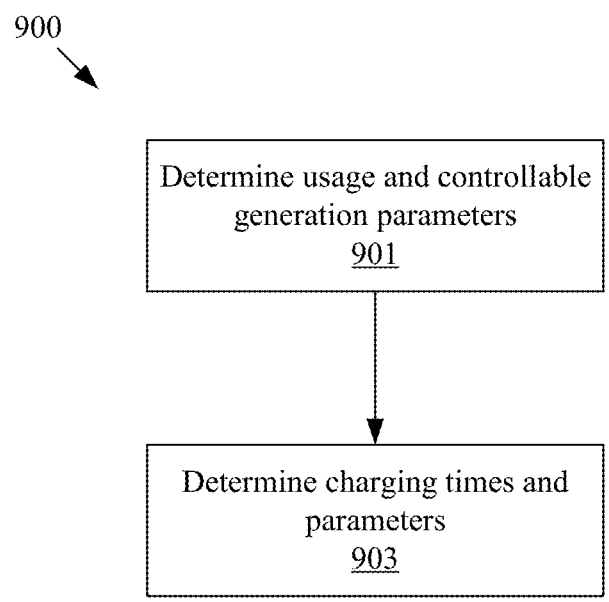
FIG. 9 shows a process flow for determining demand market parameters according to some embodiments of the technology described herein.

FIG. 9 shows a process flow for determining demand market parameters according to some embodiments of the technology described herein. The process flow 900 may be carried out by the systems described with reference to FIGS. 1-4. The process flow 900 may implement the act 603, for example.

At act 901, parameters related to power usage and controllable generation may be determined. For example, the parameters may relate to measured or predicted demand for power at one or more locations (e.g., 107A&B). In some embodiments, an amount of controllable generation, such as is provided by generators, may be determined. For example, the usage and controllable generation may be used to determine a shortfall or surplus of electricity at a given time. In some cases, no shortfall of controllable generation is required as MESU provision may be more economical than controllable generation. For example, demand market load may be determined to be the net load after accounting for native load at the location and controllable asset (e.g., generator) based loads.

At act 903, charging times and parameters are determined. Charging times may be determined based on the demand, controllable generation, and/or the demand market load. For example, the MESU charging time may be limited by the availability of controllable generation and/or level of demand.

Figure 10:
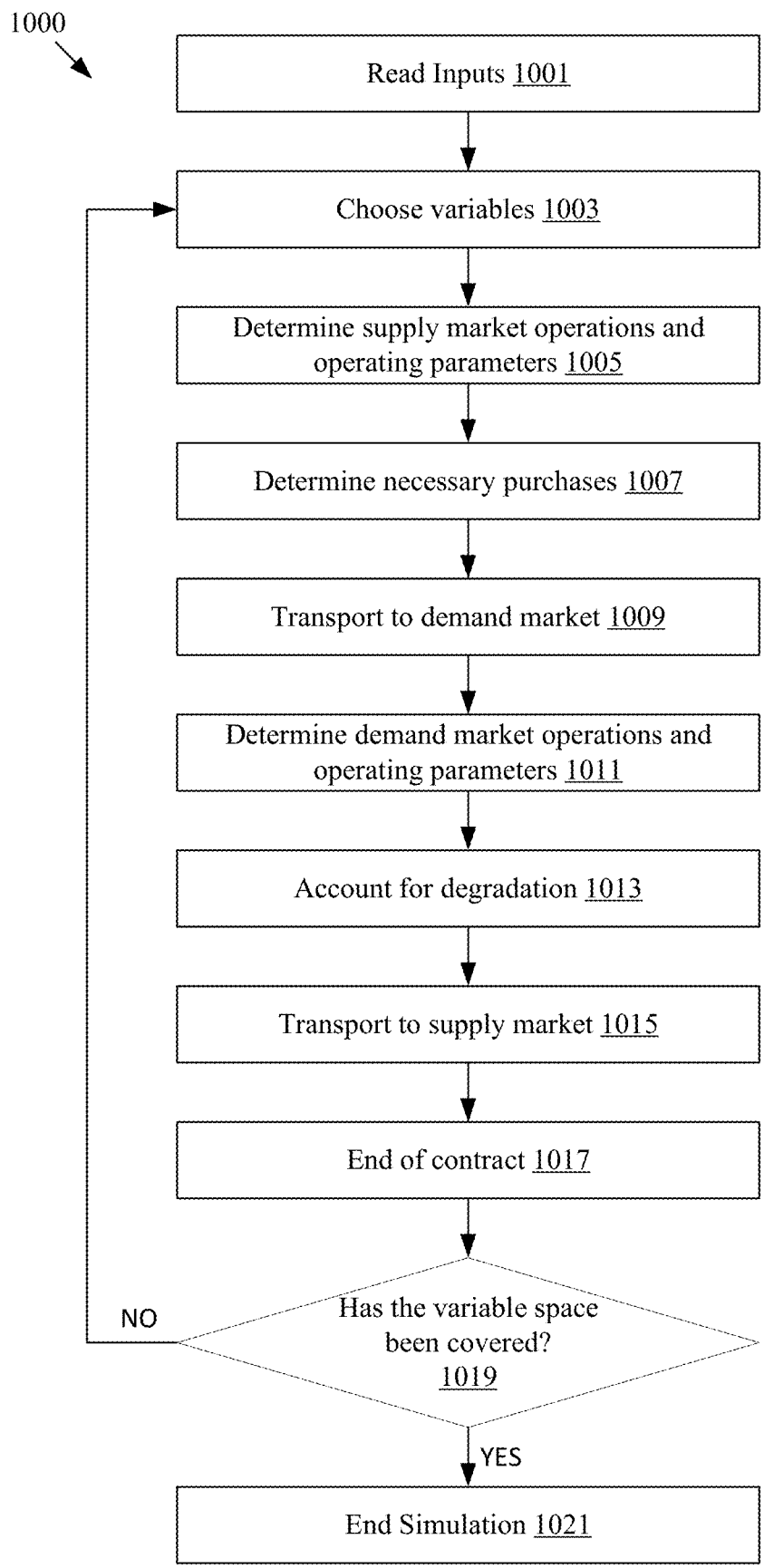
FIG. 10 shows a process flow for simulating the transportation of one or more MESU, according to some embodiments of the technology described herein.

FIG. 10 shows a process flow 1000 for simulating the transportation of one or more MESUs, according to some embodiments of the technology described herein. The process flow 1000 may be carried out by the systems described with reference to FIGS. 1-4.

At act 1001, inputs are read. For example, the inputs may relate to the logistics of transporting MESU(s), technology inputs that relate to the state of the MESU, and/or scenario inputs that relate to power supply and demand. The variables may be updated in real time (e.g., refreshed within milliseconds of new data becoming available).

At act 1003, variables are chosen for the simulation. Variables may be considered to be input variables, iterated variables, and/or determined variables. Input variables may be received at act 1001 via any suitable interface. Iterated variables may relate to possible options for storage capacity of the MESU, a maximum depth of discharge for the MESU, a target depth of discharge for the MESU, a target MESU delivery period, a minimum and/or maximum MESU delivery period, and/or other suitable options for technology and logistics. Determined variables may be determined based on interactions between the input variables and the determined variables. In some embodiments, module size, storage specific energy, and physical/mechanical infrastructure constraints in both the supply and demand markets may be used to calculate the weight of modules and ensure modules can be transported without exceeding weight limitations of the vessels used to transport the MESU(s). In some embodiments, information about vessels and ownership structures may be used with physical harbor infrastructure constraints on both the supply and demand side to determine that the vessels can operate within the harbors. In some embodiments, electrical infrastructure requirements in both the supply and demand markets may be used to determine the supporting infrastructure required by the MEST system, such as inverters, transformers, and rectifiers, and the sizing necessary for proper integration. In some embodiments, target DoD and the target delivery period are two iterated variables that are used along with demand market load information to determine the initial number of modules that are in a MESU. In some embodiments, the initial capacity of the MESU is such that its operation in the demand market for the target delivery period results in its discharging to the target DoD. For example, the target delivery period may be determined to be the ratio of the demand market load to the product of the demand market load, the MESU efficiencies, and the initial MESU capacity. In some embodiments, the number of modules in a MESU are used along with the infrastructure-constrained list of transport vessels (e.g., ships), and the capacity of contract vessels to determine which methods of transport have capacity to transport the weight and/or volume of the MESUs within a minimum delivery period. Any and all measurable and/or known limitations of the available transportation may be considered.

At act 1005, supply market operations and operating parameters may be determined. For example, the cheapest time to charge MESU may be determined based on the supply market pricing schedule and the time period during which the MESU will be at the supply market. In some embodiments, if the time period at the supply market exceeds the time to charge the MESU, the MESU may be charged at a slower rate, excess energy produced may be sold to the grid, or the MESU may be electrically inactive. The decision whether to sell power to the grid may be determined based on the value of the power, the degradation caused by selling power, the rates of charging and/or discharging, and/or the degradation of being inactive. It may be appreciated that inactive MESU may degrade at a different, slower rate than active MESU.

At act 1007, necessary purchases may be determined. For example, the MESU may be checked to determine if more storage should be purchased. For example, if a MESU will not be operable for its minimum delivery period, the MESU may operate to its maximum DoD. In some embodiments, if the maximum DoD does not allow for sufficient power to be provided, modules may be purchased and added to the MESU. In some embodiments, if transportation of the modules is constrained, degraded modules may be rearranged/replaced with existing modules and/or removed to create capacity for less degraded modules. Degraded modules may be resold or placed in reserve.

At act 1009, transportation to the demand market is simulated. The cost of transportation may be calculated based on the method chosen, for example based on the route, weight, shipping frequency, volume, access to harbor, and/or schedule flexibility. In some embodiments, the distance between supply and demand markets are used along with the speed of the vessel to determine a transit time, which may be used to determine a cost of shipping based on the vessel's time-based charter rate, crewing costs, fuel consumption rate, auxiliary costs, harbor fees, loading and/or unloading times, and any remaining logistical constraints such as last-mile scheduling associated with transporting MESU over a final distance (e.g., on land) to a destination.

At act 1011, the demand market operations and operating parameters may be determined. In some embodiments, the use of controllable generation may be modeled using a generator logic function. In some embodiments, blocks of time are determined based on the startup and shutdown times of the generator. A coverage factor of the generator may be determined for one or more of these blocks of time to represent the portion of the demand that may be met by controllable generation resources. In some embodiments, charging times and parameters for beneficial operation may be determined. The inventors have recognized that it may be computationally intractable to simulate precise parameters related to the demand market, and the parameters may be modeled (e.g., recursively) until a substantially optimum value appears to be reached. In some embodiments, demand market parameters may be predicted in advance and the predictions may be updated as data becomes available.

At act 1013, the degradation of the MESU may be accounted for. In some embodiments, variables associated with the MESU may be input to a degradation model to determine a capacity lost in a given MESU. For example, discharge rate, discharge amount, charge rate, charge amount, inactivity time, known degradation, and temperature may all be used to model and determine the degradation of a MESU. Degraded MESU(s) may be replaced or supplemented with energy modules as described above.

At act 1015, the transportation of MESU to the supply market may be simulated. The cost of transporting the MESU may be determined as was described with reference to act 1009.

At act 1017, the end of the contract may be reached. Contracts may specify delivery schedules and power amounts and prices for a given period of time. Acts 1005-1015 may be simulated repeatedly for the duration of the contract time period.

At act 1019, the simulation may iterate to cover a variable space. New variables may be selected for each iteration at act 1003. The variable space may be configured to cover a practicable number of possible transportation scenarios. In some embodiments, the variable space may be configured to make it likely that an optimal set of variables and/or parameters will be selected.

At act 1021, the simulation is ended once the suitable variable space has been covered by the simulation. The variables, parameters, and/or contract that generate efficient power transportation scenarios may be selected. In some embodiments, only the most efficient transportation scenario is selected. In some embodiments, the cost and other parameters of each transportation are weighted to maximize a utility function over each scenario.

Figure 11:
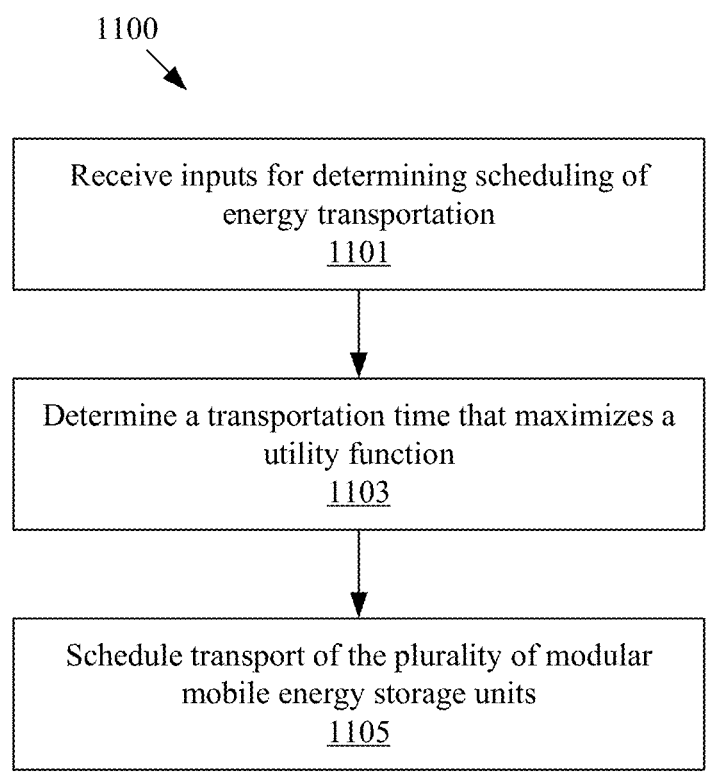
FIG. 11 shows a process flow for scheduling transportation of one or more MESU, according to some embodiments of the technology described herein.

FIG. 11 illustrates a process flow 1100 for scheduling transportation of MESU, according to some embodiments of the technology described herein. The process flow 1100 may be carried out by the systems described with reference to FIGS. 1-4.

At act 1101, inputs for determining scheduling of MESU transportation may be received, for example as was described with reference to earlier process flows. The process flow 1100 may use the same variables and/or parameters as were described with reference to FIGS. 5 and 10.

At act 1103, a utility function may be maximized to determine a transportation time for the MESU. In some embodiments, the utility function may take all or a portion of the variables and/or parameters received at act 1101 and weight them to compute an overall utility, which may be a cost function or any suitable metric. The utility function may be optimized or an optimum may be estimated using any suitable methods. In some embodiments, the utility function may be represented as a data structure that shows one or more flows of power resources between locations and associated weights (e.g. costs) and constraints. At act 1105, the transportation of MESU may be scheduled based on the function used in act 1103.

Figure 12:
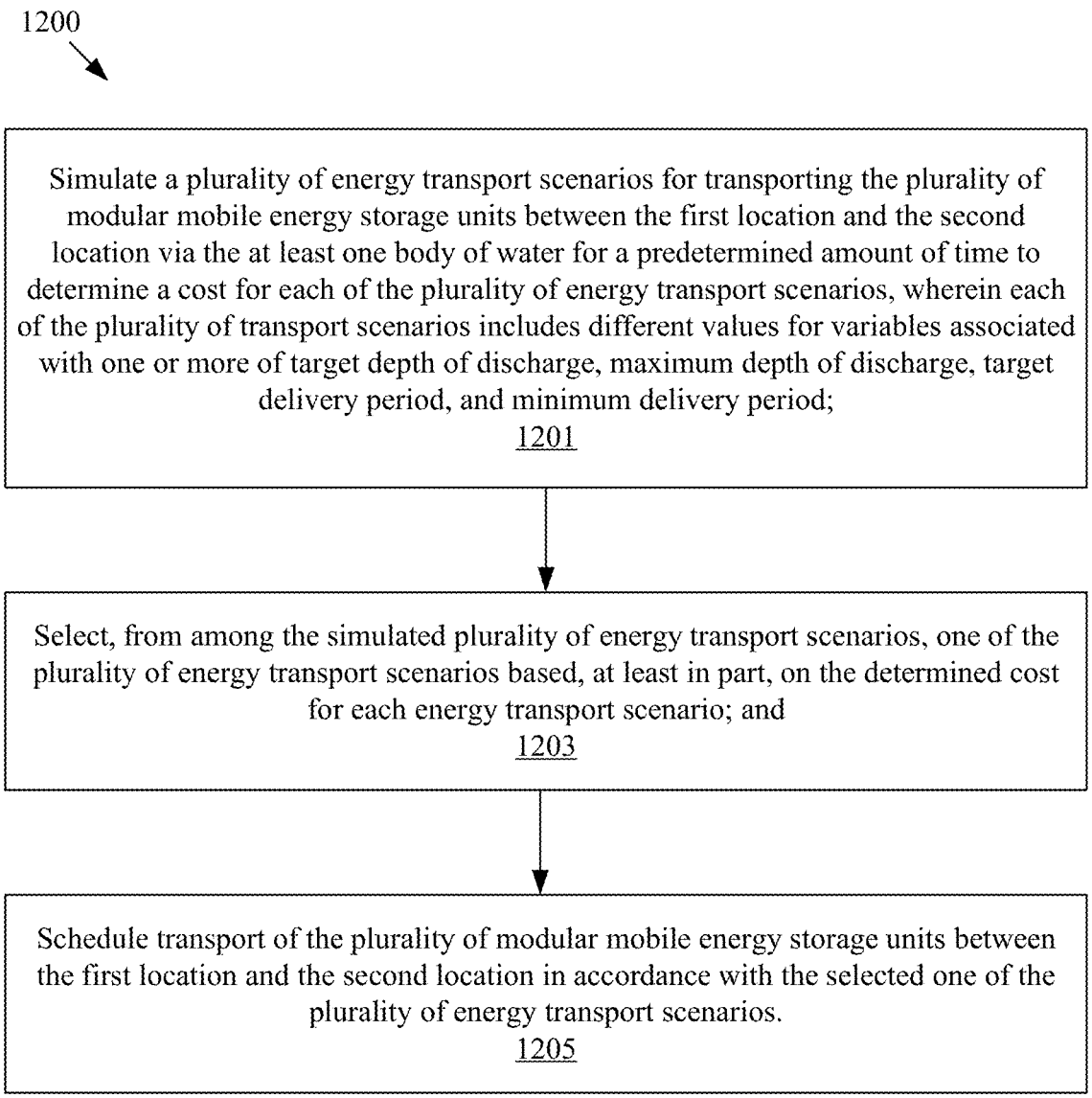
FIG. 12 shows a process flow according to some embodiments of the technology described herein.

FIG. 12 shows a process flow 1200 according to some embodiments of the technology described herein. The process flow 1200 may be carried out by the systems described with reference to FIGS. 1-4. The process flow may involve a plurality of mobile energy storage units, wherein each of the plurality of mobile energy storage units includes a plurality of energy modules configured to be at least partially charged at a first location and configured to be at least partially discharged at a second location separated from the first location by at least one body of water. The mobile energy units may be MESU as were described with reference to FIGS. 1-4.

At act 1201, a plurality of energy transport scenarios may be simulated for transporting the plurality of modular mobile energy storage units between the first location and the second location via the at least one body of water for a predetermined amount of time to determine a cost for each of the plurality of energy transport scenarios, wherein each of the plurality of energy transport scenarios includes different values for variables associated with one or more of target depth of discharge, maximum depth of discharge, target delivery period, and minimum delivery period. Simulation may include mathematically quantifying, analyzing, and evaluating the relevant parameters, variables, constraints, and/or scenarios.

In some embodiments, simulating the plurality of energy transport scenarios may include iteratively changing the values for the variables associated with one or more of target depth of discharge, maximum depth of discharge, target delivery period, and minimum delivery period for each simulation.

In some embodiments, simulating each of the plurality of energy transport scenarios includes determining supply market conditions at the first location; determining transport conditions to transport the plurality of mobile energy storage units from the first location to the second location; determining demand market conditions at the second location; and determining transport conditions to transport the plurality of mobile energy storage units from the second location to the first location.

In some embodiments, simulating each of the plurality of energy transport scenarios further includes determining, for each transport of the plurality of mobile energy storage units from the first location to the second location, whether a number of mobile energy storage units transported should be increased, decreased, or remain the same. The number of MESU may be changed instead of and/or in addition to the configuration and/or number of energy modules in any or all of the MESU.

In some embodiments, simulating each of the plurality of energy transport scenarios further includes determining, an amount of degradation of the energy modules in the plurality of mobile energy storage units. In some embodiments, simulating each of the plurality of energy transport scenarios further comprises determining a cost associated with the amount of degradation of the energy modules in the plurality of mobile energy storage units.

In some embodiments, determining supply market conditions at the first location comprises determining a next shipment time to transport the plurality of mobile energy storage units from the first location to the second location. In some embodiments, determining supply market conditions at the first location further includes determining whether the energy modules in the plurality of mobile energy storage units can be fully charged prior to the determined next shipment time; and selecting a charging process for the simulation based on whether the energy modules in the plurality of mobile energy storage units can be fully charged prior to the determined next shipment time. In some embodiments, a charging process for the simulation includes simulating charging the energy modules in the plurality of mobile energy storage units at a maximum charge rate when it is determined that the energy modules cannot be fully charged prior to the next determined shipment time; and simulating charging the energy modules at less than the maximum charge rate when it is determined that the energy modules can be fully charged prior to the determined next shipment time. In some embodiments, a charging process for the simulation includes simulating charging the energy modules in the plurality of mobile energy storage units at a maximum charge rate when it is determined (e.g., using a utility and/or objective function) that it would be suboptimal for the energy modules to be fully charged prior to the next determined shipment time; and simulating charging the energy modules at less than the maximum charge rate when it is determined that the energy modules can be fully charged prior to the determined next shipment time.

In some embodiments, determining supply market conditions at the first location further includes determining a charging schedule to charge the energy modules in the plurality of mobile energy storage units, wherein determining the charging schedule is based, at least in part, on a cost of charging the energy modules at different times and the determined next shipment time. In some embodiments, the cost of charging the energy modules includes the cost, which may be amortized, of the degradation effects on the modules; such degradation effects may be determined based on the charge/discharge rates.

In some embodiments, determining the transport conditions to transport the plurality of mobile energy storage units from the first location to the second location includes determining a cost of transportation from the first location to the second location.

In some embodiments, determining a cost of transportation from the first location to the second location includes determining a transit time between the first location and the second location via the at least one body of water; determining a shipping rate to transport the mobile energy storage units from the first location to the second location; and determining the cost of transportation from the first location to the second location based, at least in part, on the determined transit time and the determined shipping rate. The shipping rate may include the cost of chartering a vehicle instead of or in addition to the cost, possibly amortized and/or variable, of purchasing and operating a vehicle. In some embodiments, the shipping rate comprises costs associated with chartering and/or operating a vehicle (e.g. a vessel 105A or B, any suitable ship, a truck, a forklift, and/or a crane) used in shipping.

In some embodiments, determining the transport conditions to transport the plurality of mobile energy storage units from the first location to the second location further comprises determining a transportation route comprising overland transportation between 1) the first location and a first intermediate location and/or 2) a second intermediate location and the second location. In some embodiments, the cost of transportation includes a cost of overland transportation (e.g., using a crane, forklift, truck, and/or any other suitable land vehicle) between 1) the first location and the first intermediate location and/or 2) the second intermediate location and the second location.

In some embodiments, determining demand market conditions at the second location includes determining a next shipment time to transport the plurality of mobile energy storage units from the second location to the first location; and determining an estimated energy usage until the determined next shipment time.

In some embodiments, determining transport conditions to transport the plurality of mobile energy storage units from the second location to the first location includes determining a cost of transportation from the second location to the first location.

In some embodiments, determining a cost of transportation from the second location to the first location includes determining a transit time between the second location and the first location via the at least one body of water; determining a shipping rate to transport the mobile energy storage units from the second location to the first location; and determining the cost of transportation from the second location to the first location based, at least in part, on the determined transit time and the determined shipping rate.

At act 1203, one of the plurality of energy transport scenarios may be selected, from among the simulated plurality of energy transport scenarios, based, at least in part, on the determined cost for each energy transport scenario.

In some embodiments, the at least one computer hardware processor is further programmed to select the one of the plurality of energy transport scenarios based, at least in part, on a number of capital purchases required during the predetermined amount of time.

At act 1205, the transport of the plurality of modular mobile energy storage units between the first location and the second location may be scheduled in accordance with the selected one of the plurality of energy transport scenarios.

The above-described embodiments of the technology described herein may be implemented in any of numerous ways. For example, the embodiments may be implemented using hardware, software, or a combination of hardware and software (e.g., as shown in FIG. 4). When implemented in software, the software code may be executed on any suitable processor or collection of processors, whether provided in a single computer or distributed among multiple computers.

Such computers may be interconnected by one or more communication media (e.g., networks) in any suitable form, including a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks. Such network(s) may be an intelligent, interconnected network which may facilitate the exchange of relevant parameters and data, for example with industry consortia and/or other groups, among other benefits.

An implementation of a computer system (e.g., 400) that may be used in connection with any of the embodiments of the technology described herein may include one or more processors (e.g., 441) and one or more articles of manufacture that comprise non-transitory computer-readable storage media (e.g., memory and one or more non-volatile storage media). The processor may control writing data to and reading data from the memory and the non-volatile storage device in any suitable manner, as the aspects of the technology described herein are not limited in this respect. To perform any of the functionality described herein, the processor may execute one or more processor-executable instructions stored in one or more non-transitory computer-readable storage media (e.g., the memory), which may serve as non-transitory computer-readable storage media storing processor-executable instructions for execution by the processor.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the technology described herein need not reside on a single computer or processor, but may be distributed in a modular fashion among different computers or processors to implement various aspects of the present invention.

Processor-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which examples have been provided, including with reference to FIGS. 5-12. The acts performed as part of each method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The invention claimed is:

1. A modular mobile energy storage system, comprising:
a plurality of mobile energy storage units, wherein each of the plurality of mobile energy storage units includes a plurality of energy modules configured to be at least partially charged at a first location and configured to be at least partially discharged at a second location separated from the first location by at least one body of water;
at least one computer hardware processor programmed to:
simulate a plurality of energy transport scenarios for transporting the plurality of modular mobile energy storage units between the first location and the second location via the at least one body of water for a predetermined amount of time to determine a cost for each of the plurality of energy transport scenarios, wherein each of the plurality of energy transport scenarios includes different values for variables associated with one or more of target depth of discharge, maximum depth of discharge, target delivery period, and minimum delivery period; and
select, from among the simulated plurality of energy transport scenarios, one of the plurality of energy transport scenarios based, at least in part, on the determined cost for each energy transport scenario; and
a transport scheduling system configured to schedule transport of the plurality of modular mobile energy storage units between the first location and the second location in accordance with the selected one of the plurality of energy transport scenarios,
wherein simulating each of the plurality of energy transport scenarios comprises:
determining supply market conditions at the first location;
determining transport conditions to transport the plurality of mobile energy storage units from the first location to the second location;
determining demand market conditions at the second location; and
determining transport conditions to transport the plurality of mobile energy storage units from the second location to the first location; and
wherein determining supply market conditions at the first location comprises:
determining a next shipment time to transport the plurality of mobile energy storage units from the first location to the second location;
determining whether the energy modules in the plurality of mobile energy storage units can be fully charged prior to the determined next shipment time; and
selecting a charging process for the simulation based on whether the energy modules in the plurality of mobile energy storage units can be fully charged prior to the determined next shipment time.

2. The modular mobile energy storage system of claim 1, wherein simulating the plurality of energy transport scenarios comprises iteratively changing the values for the variables associated with one or more of target depth of discharge, maximum depth of discharge, target delivery period, and minimum delivery period for each simulation.

3. The modular mobile energy storage system of claim 1, wherein the at least one computer hardware processor is further programmed to:
select the one of the plurality of energy transport scenarios based, at least in part, on a number of capital purchases required during the predetermined amount of time.

4. The modular mobile energy storage system of claim 1, wherein simulating each of the plurality of energy transport scenarios further comprises:
determining, for each transport of the plurality of mobile energy storage units from the first location to the second location, whether a number of mobile energy storage units transported should be increased, decreased, or remain the same.

5. The modular mobile energy storage system of claim 1, wherein simulating each of the plurality of energy transport scenarios further comprises:
determining, an amount of degradation of the energy modules in the plurality of mobile energy storage units.

6. The modular mobile energy storage system of claim 5, wherein simulating each of the plurality of energy transport scenarios further comprises:
determining a cost associated with the amount of degradation of the energy modules in the plurality of mobile energy storage units.

7. The modular mobile energy storage system of claim 1, wherein selecting a charging process for the simulation comprises:
simulating charging the energy modules in the plurality of mobile energy storage units at a maximum charge rate when it is determined that the energy modules cannot be fully charged prior to the next determined shipment time; and
simulating charging the energy modules at less than the maximum charge rate when it is determined that the energy modules can be fully charged prior to the determined next shipment time.

8. The modular mobile energy storage system of claim 1, wherein determining supply market conditions at the first location further comprises:
determining a charging schedule to charge the energy modules in the plurality of mobile energy storage units, wherein determining the charging schedule is based, at least in part, on a cost of charging the energy modules at different times and the determined next shipment time.

9. The modular mobile energy storage system of claim 1, wherein determining the transport conditions to transport the plurality of mobile energy storage units from the first location to the second location comprises determining a cost of transportation from the first location to the second location.

10. The modular mobile energy storage system of claim 9, wherein determining a cost of transportation from the first location to the second location comprises:
determining a transit time between the first location and the second location via the at least one body of water;
determining a shipping rate to transport the mobile energy storage units from the first location to the second location; and
determining the cost of transportation from the first location to the second location based, at least in part, on the determined transit time and the determined shipping rate.

11. The modular mobile energy storage system of claim 10, wherein the shipping rate comprises costs associated with chartering and/or operating a vehicle used in shipping.

12. The modular mobile energy storage system of claim 9, wherein determining the transport conditions to transport the plurality of mobile energy storage units from the first location to the second location further comprises determining a transportation route comprising overland transportation between 1) the first location and a first intermediate location and/or 2) a second intermediate location and the second location.

13. The modular mobile energy storage system of claim 12, wherein the cost of transportation includes a cost of overland transportation between 1) the first location and the first intermediate location and/or 2) the second intermediate location and the second location.

14. The modular mobile energy storage system of claim 1, wherein determining demand market conditions at the second location comprises:
determining a next shipment time to transport the plurality of mobile energy storage units from the second location to the first location; and
determining an estimated energy usage until the determined next shipment time.

15. The modular mobile energy storage system of claim 1, wherein determining transport conditions to transport the plurality of mobile energy storage units from the second location to the first location comprises determining a cost of transportation from the second location to the first location.

16. The modular mobile energy storage system of claim 15, wherein determining a cost of transportation from the second location to the first location comprises:
determining a transit time between the second location and the first location via the at least one body of water;
determining a shipping rate to transport the mobile energy storage units from the second location to the first location; and
determining the cost of transportation from the second location to the first location based, at least in part, on the determined transit time and the determined shipping rate.

* * * * *